INVENTORS
Edgar P. Turner and
Walter J. Scheuerer

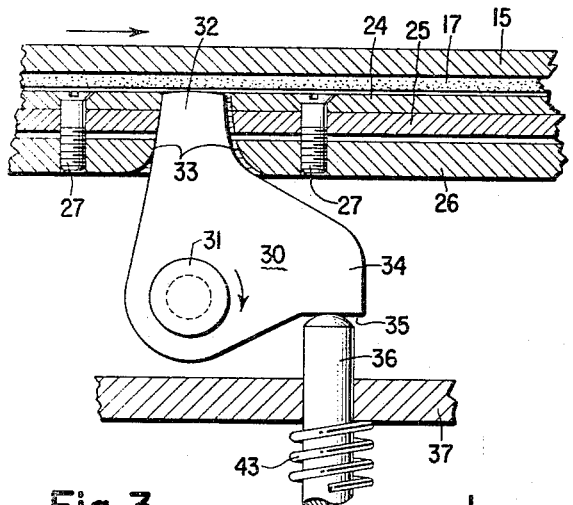
Fig.3
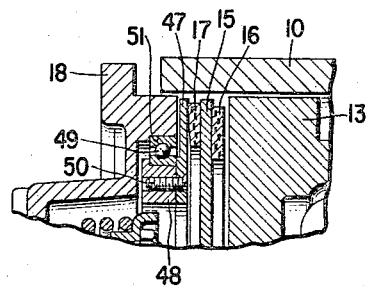
Fig.5
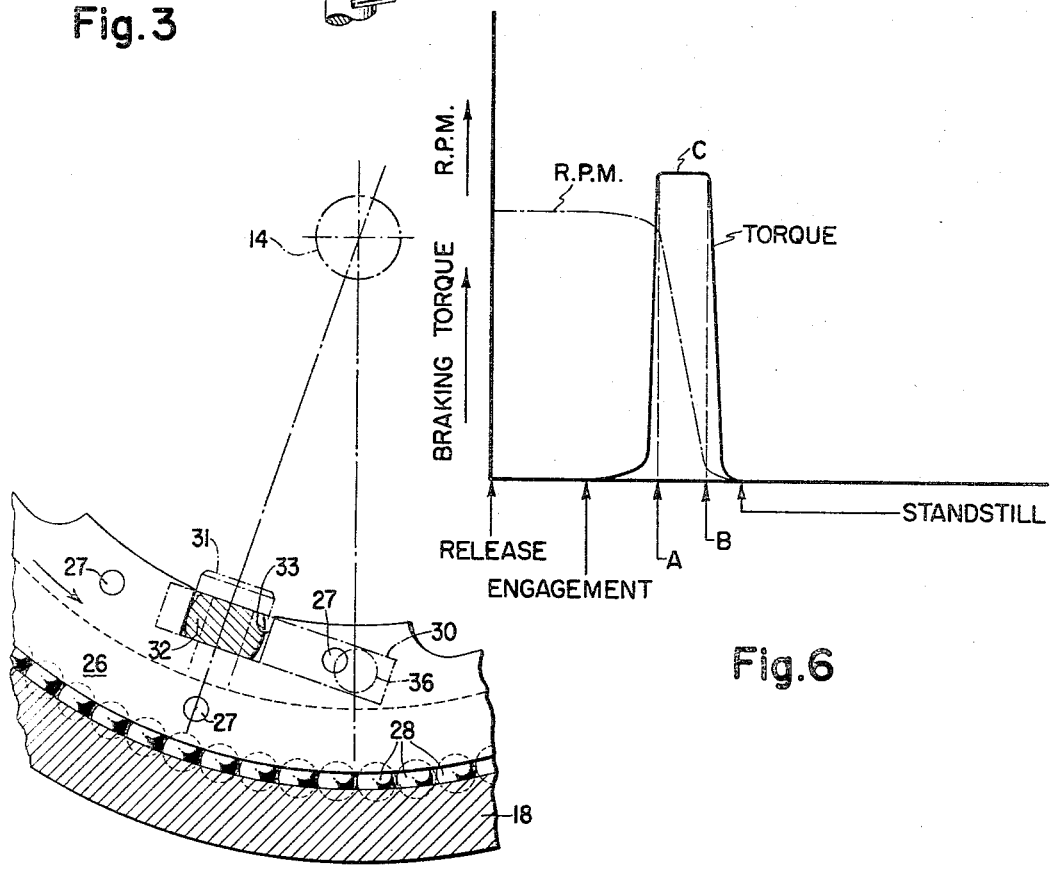
Fig.4
Fig.6 ated Apr. 11, 1967

3,313,384
CLUTCH-BRAKE DRIVING DEVICES
Edgar P. Turner, Scotch Plains, and Walter J. Scheuerer, Califon, N.J., assignors to The Singer Company, New York, N.Y., a corporation of New Jersey
Filed Nov. 1, 1965, Ser. No. 505,854
6 Claims. (Cl. 192—18)

This invention relates to clutch-brake driving devices and more specifically to self-energizing brake mechanisms for such devices for obtaining rapid starting and stopping of a driven load such as a textile loom.

It is customary with prior art clutch-brake driving devices for looms to employ heavy brake springs so that, when the shipper rod is released, a large braking torque is produced for quick stopping of the loom. This has the serious disadvantage of requiring considerable force to overcome the brake spring force in order to engage the clutch in driving position and such heavy spring-engaged brakes tend to bounce and be erratic in their engagement.

The above difficulty is overcome according to this invention wherein a light brake spring may be used only to initiate the braking torque which is then quickly intensified by mechanism which converts the momentum of the driven load into a large braking torque. Thus, although a desirably light brake spring may be used, the braking effect of a much heavier spring is produced by the mechanism of this invention and without its disadvantages.

The mechanism of this invention comprises a brake disc mounted for rotation in the clutch end-cover in the position formerly occupied by the stationary brake surface. When the clutch lever is moved to brake position, the rotation of the driven element is imparted by the friction coupling to the rotatable brake disc, which disc is coupled to the clutch lever through a bell crank and push rod connection. Thus the momentum of the driven load is converted to a force acting on the clutch lever to drive the clutch further into braking position. A stop limits the maximum movement of the clutch lever into braking position and when this position is reached, the rotatable brake disc becomes stationary and a large braking torque is suddenly produced having a maximum magnitude related to the momentum of the loom connected to the driven element and independently of the size of the brake spring. The braking torque will be maintained as long as the load momentum can supply it and thus the braking torque is always desirably matched to the load requirements to obtain minimum braking time regardless of the load.

It is an object of this invention, therefore, to provide a clutch-brake driving device in which there is mechanism for obtaining very rapid stopping without using an extremely heavy spring.

A further object of the invention is to provide simple mechanism for selectively converting the momentum of a driven load into a proportional braking torque for the load.

A still further object of the invention is to provide a light spring-biased brake having mechanism for deriving an increased braking torque independently of said biasing spring.

Other objects of the invention will be readily apparent when the following description is considered in connection with the following drawings:

In the drawings:

FIG. 3 is a sectional detail, partly in plan, taken substantially on line 3—3 of FIG. 2.

FIG. 4 is a sectional detail, partly in elevation, taken substantially on line 4—4 of FIG. 1.

FIG. 5 is a longitudinal sectional detail illustrating a modification of the device of FIG. 1.

FIG. 6 is a graph showing the performance of the device of this invention.

The device of this invention is shown embodied in a clutch-brake driving motor of the type shown and described in the copending United States patent application Ser. No. 368,863, filed May 20, 1964, now Pat. No. 3,253,686 assigned to the same assignee as the present invention and to which reference may be made for a more complete understanding thereof.

Figure 1:
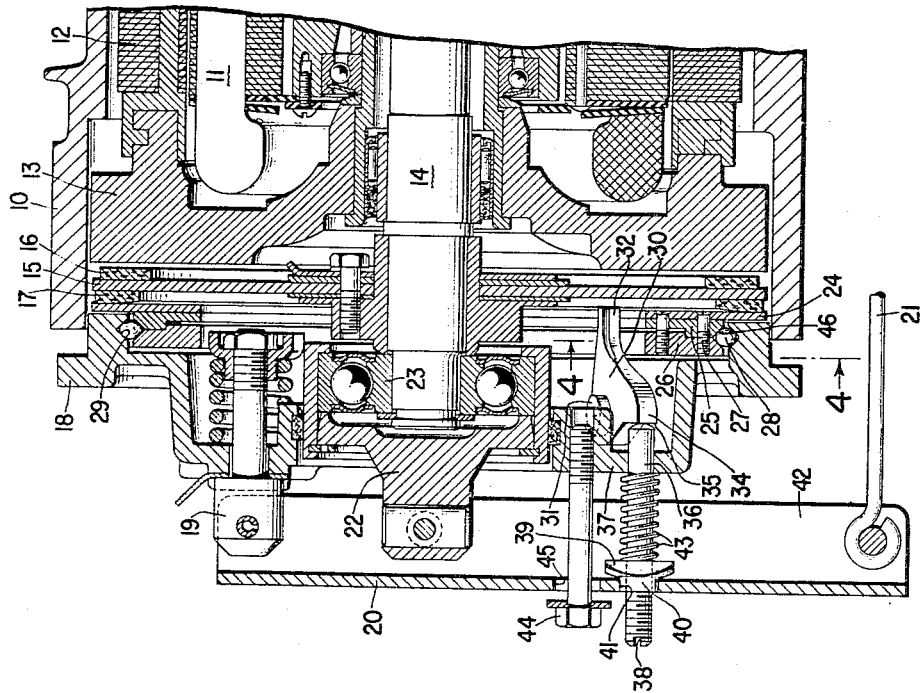
FIG. 1 is a longitudinal sectional view taken through a clutch-brake driving device illustrating an embodiment of this invention.

It is sufficient for the purposes of this invention to note that, as shown in FIG. 1, a stator frame 10 houses a motor including a stator 11 and a rotor 12 carrying a flywheel 13. An output driven shaft 14 carries a rotary clutch element 15 having friction facings 16 and 17. An end closure 18, secured to the frame 10, carries a stud 19 to which is pivoted one end of a lever 20 having at its opposite end an operating rod 21 connected thereto.

Intermediate the ends of lever 20 and pivotally connected thereto is a yoke assembly 22 which carries a throw-out bearing 23 in which is journaled the driven shaft 14. All of the above structure is disclosed in the above-noted copending application and it will be evident that endwise movement of the operating rod 21 imparts angular movement to lever 20 about its pivot and imparts through yoke 22 and bearing 23 endwise movement to shaft 14 and to the rotary clutch element 15 connected thereto.

In the prior structure referred to in the copending application, an inner surface of the end closure 18 formed a stationary braking surface and the clutch element 15 was moved selectively into frictional engagement either with the rotor 12 and flywheel 13 or the stationary braking surface according to whether driving or braking was desired.

Figure 2:
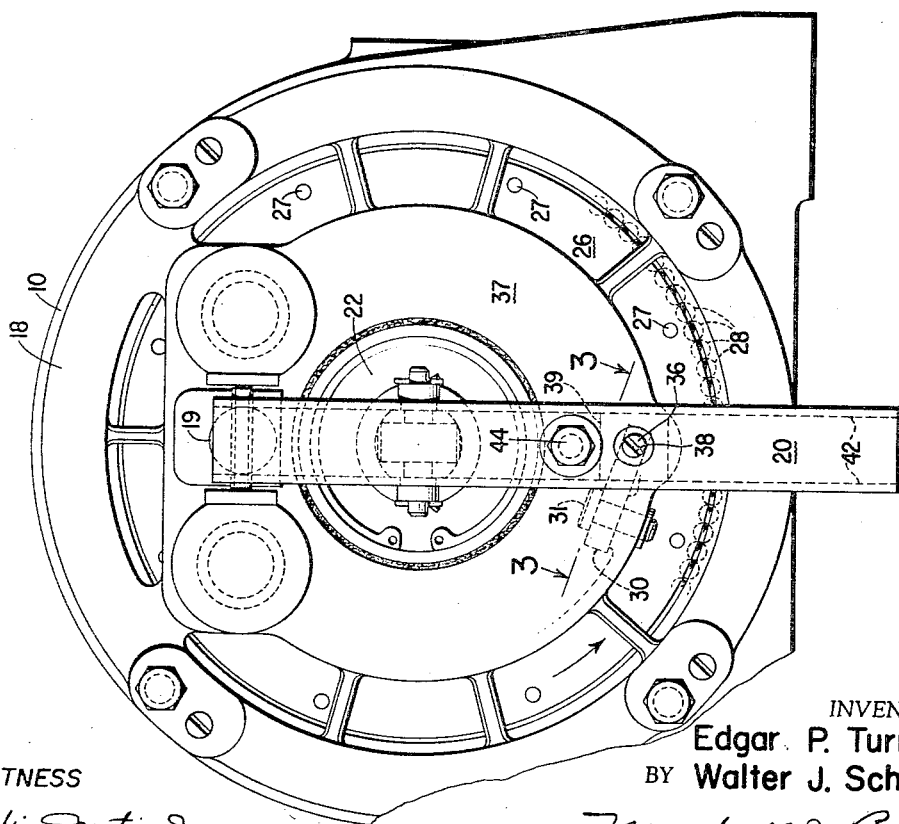
FIG. 2 is a left end elevational view of the device of FIG. 1.

In the device according to the present invention, however, the stationary braking surface is not used for braking and, in its place, a rotary friction element is used. As seen in FIG. 1, this rotary friction element is built up of three apertured discs 24, 25 and 26, held together in face-to-face engagement by screws 27 which pass through discs 24 and 25 and are threaded into disc 26. Discs 25 and 26 preferably have matching peripheral shoulders for proper fitting to form an inner race 46 for a series of balls 28 placed in a circular array as shown best in FIG. 2. The outer race 29 for the balls 28 is formed in the end closure 18 as clearly seen in FIG. 1. The disc 24 extends radially beyond discs 25 and 26 and forms the actual braking surface for engagement with the friction facing 17 of the rotary clutch element 15. From this structure, it is evident that, to assemble this rotary friction element, the disc 26 is placed within the end closure 18 in an upended position, the balls 28 are dropped in and the discs 24 and 25 secured in proper position over the balls 28 by means of the screws, whereupon the balls 28 are held captive in the assembly.

Successful operation has been experienced with a circular array of steel balls 28 in connection with properly prepared races 29 and 46. It has also been found that the balls 28 may be made of a somewhat more yieldable material than steel with good results. One such yieldable material that has actually been used with good success is one of the moldable polycarbonate resins, known commercially as Lexan. However, it is possible to use a conventional large-diameter ball bearing to rotatably support the rotary friction elements 24, 25 and 26, as will be described later in more detail.

It will be noted that there is positive clearance between the inner surface of the end closure 18 and the disc 24 and the structure of the rotary friction element is purposely made stiff enough to maintain this clearance at all times regardless of the end thrust imparted by the clutch element 15.

A bell-crank 30 pivoted on pin 31, secured to the end-closure 18 on a radial axis which passes through the shaft axis as seen best in FIG. 4, is formed with a first arm 32 which engages a notch 33 formed by aligned notches in the interior peripheries of the assembled discs 24, 25 and 26 as shown in FIGS. 3 and 4. The fit of the arm 32 in the notch 33 is nominal and in no sense critical. A second arm 34 of the bell-crank 30 is formed with a face 35 which engages one end of a push-rod 36 which is free to move endwise in the wall 37 of end closure 18. The other end of the push-rod 36 is formed with a screwdriver slot 38 and is threaded to receive a square nut 39. The nut 39 is formed with a cylindrical hub portion 40 which is freely received in an aperture 41 made in the lever 20. Any thrust exerted on the end of push-rod 36 by the bell-crank 30 is transmitted to the lever 20 through the nut 39 to urge the lever further to the left as seen in FIG. 1. The nut 39 is non-rotatable in the lever 20 by reason of the close fit thereof between the sides 42—42 of the lever. A brake spring 43 surmounts the push-rod 36 and is held compressed between the nut 39 and the wall 37. Adjusting push-rod 36 by rotation thereof by means of a screwdriver applied to slot 38 adjusts the position of bell-crank 30 relative to lever 20 but does not change force exerted by spring 43.

A headed screw 44 passes through an aperture 45 in the lever 20 and is threaded into the wall 37 of the end closure 18 and may be adjusted to establish a maximum safe brake limiting position for the lever 20 as will be described.

OPERATION

In the position of the parts shown in FIG. 1, which is the normal braked position with the static load holding the shaft 14 stationary, the spring 43 is under compression and, through lever 20, biases the rotary clutch 15 into frictional engagement through facing 17 with the disc 24 of the rotary frictional element.

To drive a load connected to the shaft 14, the operating-rod 21 is manually moved to the right, as viewed in FIG. 1, and latched in this position by means not shown. It will be noted that this requires further compression of spring 43, which represents a force to be overcome manually and it is desirable to keep this force to a minimum value consistent with good braking performance. The lever 20, through yoke 22 and bearing 23, moves shaft 14 endwise toward the right and the clutch element 15 engages the flywheel 13 and rotor 12 in frictional driving relation through facing 16 and the load connected to shaft 14 is brought up to speed.

When it is desired to quickly brake the driven load to standstill, the latch (not shown) holding the operating rod 21 in clutch position is released and the force exerted by spring 43 pushes lever 20 to the left, as viewed in FIG. 1, thereby moving the shaft 14 to the left, thus disengaging the clutch 15 from the driving rotor 12 and engaging the clutch 15 with the friction disc 24. This initial engagement imparts rotation to the friction element, made up of discs 24, 25 and 26, from the rotation of clutch 15, which is rotating by virtue of kinetic energy stored in the load. The rotation of the friction element is in a direction, as shown by the arrow in FIG. 3, to impart a turning moment to the bell-crank 30 through the arm 32 and notch 33, which produces an end thrust on the push rod 36 through arm 34 and face 35. The push rod 36 is moved to the left (FIG. 1) and the nut 39 transmits this motion to the lever 20 to move it further to the left and thus force the clutch 15 further into frictional engagement with the rotary friction disc 24. All the above takes place very rapidly and the lever 20 quickly reaches its limiting position against the headed screw 44 in a time of a few milliseconds during which the frictional force between the clutch element 15 and the rotary friction element has risen to a very high value. When the lever 20 stops moving, the rotary friction element stops rotating and becomes a stationary braking surface connected to the load through a large frictional force which represents a large braking torque and the kinetic energy of the load is quickly absorbed by the high friction loss. The force on the push-rod 36 remains constant so long as elements 20 and 44 remain in contact. This condition persists substantially until the instant the connected load comes to a standstill. At this point, flexure of lever 20 and the associated parts applies reverse torque through push-rod 36 and bell-crank 30 to element 24, thus returning the parts to the position shown in FIG. 1. At this point, spring 43 alone supplies the normal brake engaging force.

The above performance is shown graphically in FIG. 6 while the braking torque applied to shaft 14 and its rotational speed are plotted as a function of time. The origin marked "release" denotes the time at which the operating rod 21 is released. At the time marked "engagement," the friction facing 17 on clutch 15 engages the disc 24 and it begins to rotate. At point "A" lever 20 engages headed screw 44 and maximum braking torque C is reached because element 24 stops rotating and acts as a stationary braking surface. This maximum torque C is maintained during the period of maximum deceleration as shown until point B is reached where the shaft 14 is almost at standstill and flexure of lever 20 and the associated parts including clutch 15 applies reverse torque through push-rod 36 and bell-crank 30 to element 24, thus returning the parts to a position in which the spring 43 is alone supplying the brake engaging force. The time from A to B is approximately 2 to 3 milliseconds in a representative case for a device of this invention driving a textile loom. The fact that the braking force is applied by the momentum of the load through the friction or loss material of facing 17 tends to damp out oscillations in the system and reduces or prevents adverse bounce of clutch 15 with respect to the rotary friction element.

From the above it will be seen that the braking torque attained by the mechanism of this invention is many times that obtainable by the conventional brake spring acting alone. As a matter of fact, according to this invention, the brake spring 43 need only supply a force large enough to provide *initial* engagement of the clutch element 15 (when released) with the rotary friction element, after which the momentum of the load itself supplies the force necessary to produce the large braking torques attainable with this device. This torque is so large when this device is applied to driving textile looms that it has to be limited as provided by the headed screw 44 in order to prevent damage to the loom parts. The extent of flexure of level 20 and the associated clutch 15 permitted by the adjustment of the screw 44 determines the amount of frictional force built up between elements 15 and 24. The braking torque increases rapidly with flexure of lever 20 and clutch 15 and reaches a maximum value when lever 20 contacts screw 44. Thereafter, element 24 acts as a stationary braking surface to brake the driven load to standstill.

FIG. 5 illustrates a modification within the scope of this invention wherein the rotary friction element is built up of two discs 47 and 48 instead of three and a regular large-diameter ball bearing 49 is used instead of the separate balls. The discs 47 and 48 are held together in face-to-face contact by screws 50 applied around the periphery thereof, which thus clamps the inner race of bearing 49 therebetween. The outer race of bearing 49 is pressed into a shouldered seat 51 formed in the end closure 18. The operation of the device as above modified is the same as for the device of FIGS. 1, 2, 3 and 4 previously given.

Having thus described the nature of the invention, what is claimed herein is:

1. A clutch-brake driving device comprising a rotary driving element, a rotary driven element and a rotary friction element positioned in spaced relation on a common axis of rotation, the driven element being selectively slidable along said axis in one direction to engage the driving element and in the opposite direction to engage the rotary friction element, means responsive to rotation imparted to the friction element by engagement with the driven element for axially moving the driven element further into frictional engagement with the friction element, and means for subsequently limiting the rotation of the friction element whereby a braking torque is applied to the driven element having a magnitude related to the force of frictional engagement between the driven element and the friction element.

2. A clutch-brake driving device comprising; a rotary driving element, a rotary dirven element and a rotary friction element positioned on a common axis of rotation, lever for moving the driven element along said axis in one direction to engage the driving element, and in the opposite direction to engage the rotary friction element, means coupling the rotary friction element to said lever whereby rotation imparted to the rotary friction element by engagement with the driven element imparts movement to said lever to urge the driven element further into frictional engagement with the rotary friction element, and stop means for limting the maximum movement of said lever means.

3. A clutch-brake device according to claim 2 wherein said coupling means includes a bell crank having one arm operatively connected to said rotary friction element and the other arm operatively connected to said lever means through a push rod.

4. A clutch-brake driving device according to claim 2 whereby the rotary friction element is a disc supported for rotation on a circular array of balls.

5. A clutch-brake driving device according to claim 2 wherein the lever means is biased to effect frictional engagement of the driven element with the friction element in the normal unoperated position of the lever means.

6. A clutch-brake driving device comprising; a driving rotor, a driven shaft, a rotary clutch element connected to said driven shaft and movable into and out of driving engagement with said rotor, a friction disc supported for rotation adjacent to the clutch element, a lever for manually moving the clutch element out of engagement with the driving rotor and into frictional engagement with the friction disc, whereby the rotation of the driven shaft imparts rotation to the friction disc, means for translating the rotation of the friction disc into motion of said lever to urge the clutch element further into frictional engagement with the friction disc, and adjustable stop means for limiting said motion of the lever and preventing further rotation of said friction disc whereby said friction disc is effective to brake said driven shaft to standstill.

References Cited by the Examiner

UNITED STATES PATENTS

| | | | |
|---|---|---|---|
| 2,068,885 | 1/1937 | Lyman et al. | 192—32 X |
| 2,920,730 | 1/1960 | Shapiro | 192—18 |
| 3,049,209 | 8/1962 | Reece | 192—35 X |

DAVID J. WILLIAMOWSKY, *Primary Examiner.*

A. T. McKEON, *Assistant Examiner.*